(12) United States Patent
Robinson

(10) Patent No.: US 8,793,724 B2
(45) Date of Patent: Jul. 29, 2014

(54) IMAGE DOMAIN COMPLIANCE

(71) Applicant: Eldon Technology Ltd., Steeton (GB)

(72) Inventor: David Robinson, Steeton (GB)

(73) Assignee: Eldon Technology Limited (GB)

( * ) Notice: Subject to any disclaimer, the term of this patent is extended or adjusted under 35 U.S.C. 154(b) by 0 days.

(21) Appl. No.: 13/672,557

(22) Filed: Nov. 8, 2012

(65) Prior Publication Data

US 2014/0130083 A1 May 8, 2014

(51) Int. Cl.
*H04N 21/4627* (2011.01)
*G06F 21/10* (2013.01)

(52) U.S. Cl.
USPC .............. 725/31; 705/52; 705/51; 705/57

(58) Field of Classification Search
CPC .............. H04N 21/25816; G06F 21/33; H04L 29/06755
USPC ............................................ 725/31, 139, 151
See application file for complete search history.

(56) References Cited

U.S. PATENT DOCUMENTS

| 6,370,279 | B1 * | 4/2002 | Paik | 382/268 |
| 8,483,078 | B2 * | 7/2013 | Crookes et al. | 370/252 |
| 2001/0053183 | A1 * | 12/2001 | McVeigh et al. | 375/240.16 |
| 2001/0055340 | A1 * | 12/2001 | Kim et al. | 375/240.21 |
| 2007/0157234 | A1 * | 7/2007 | Walker | 725/38 |
| 2010/0154021 | A1 * | 6/2010 | Howarter et al. | 725/141 |

FOREIGN PATENT DOCUMENTS

WO 01/24532 A1 5/2001

OTHER PUBLICATIONS

"Digital Video Broadcasting (DVB); Content Protection and Copy Management (DVB-CPCM); Part 3: CPCM Usage State Information European Broadcasting Union, Union Europeenne de Radio-Television; Ebuauer; ETSI TS 102 825-3," ETSI Standard, European Telecommunications Standards Institute (ETSI), Sophia Antipolis Cedex, France, No. V1.1.1, Jul. 1, 2008, XP014042034, 28 pages.
DVB Organization: "En300468v1.14.1-si-dat201r81—SI Specification.pdf", DVB, Digital Video Broadcasting, c/o EBU-17A Ancienne Route—CH-1218 Grand Saconnex, Geneva—Switzerland, Sep. 25, 2012, XP017840182, 172 pages.
European Search Report mailed Mar. 4, 2014, EP 13192169, 9 pages.
Kim, Hee-Yong et al, "DCT Domain Filter for ATV Down Conversion," Consumer Electronics, 1997. Digest of Technical Papers. ICCE, International Conference on, IEEE, Jun. 11, 1997, pp. 142-143, XP032381904, DOI: 10.1109/ICCE.1997.625904, ISBN: 978-0/7803-3734-3, 2 pages.

\* cited by examiner

*Primary Examiner* — Benjamin R Bruckart
*Assistant Examiner* — Michael M Nguyen
(74) *Attorney, Agent, or Firm* — Kilpatrick Townsend & Stockton LLP

(57) ABSTRACT

Systems and methods for generating domain-compliant image data. Domain-specific usage rights may be evaluated. The domain-specific usage rights may be associated with the transfer of particular encoded image data to a particular computing system other than the computing system. The domain-specific usage rights may specify maximum allowable spatial frequency content of the particular encoded image data. Domain-compliant image data may be generated by removing particular disallowable spatial frequency content from the encoded image data prior to transfer to the particular computing system.

17 Claims, 6 Drawing Sheets

IMAGE DOMAIN COMPLIANCE

BACKGROUND

High-definition content providers may include terrestrial broadcasters, satellite broadcasters, cable broadcasters, digital video discs, and others. Providers of high-definition content may market the same to consumers as a premium service, and thus may be concerned about unauthorized use or usage. At the same time, however, the provider may be interested in providing consumers the option of accessing particular high-definition content in a reduced resolution format, in the interest of providing the best possible service to the consumer(s). It may therefore be beneficial to provide a mechanism that allows high-definition providers to protect premium services, while concurrently ensuring that consumer satisfaction is maintained.

SUMMARY

This Summary does not in any way limit the scope of the claimed subject matter.

In one aspect, a method for generating domain-compliant image data is disclosed. The method may include evaluating, by a computing system, domain-specific usage rights that are associated with the transfer of particular encoded image data to a particular computing system other than the computing system, wherein the domain-specific usage rights specify maximum allowable spatial frequency content of the particular encoded image data. The method may further include generating, by the computing system and based on the evaluating, domain-compliant image data by removing particular disallowable spatial frequency content from the encoded image data prior to transfer to the particular computing system.

In another aspect, a computer-implemented method is disclosed that may include receiving, by a computing system, a data stream of encoded packetized content. The method may further include identifying, by the computing system, a particular encoded packet of the data stream as having video content that requires electronic scrambling prior to export from the computing system to a different computing system. The method may still further include determining, by the computing system, a particular threshold value that defines allowable spatial frequencies of video content within the particular encoded packet, the threshold associated with the export of packetized content from the computing system to the different computing system. The method may still further include modifying, by the computing system, discrete cosine transform (DCT) coefficients of the particular encoded packet that exhibit a matrix column or row index value greater than the particular threshold value to zero magnitude, without completely decoding the particular encoded packet.

In another aspect, a set-top-box is disclosed. The set-top-box may include a first module configured to receive at least one video packet, and extract direct cosine transform (DCT) coefficients within the at least one video packet without fully decoding the at least one video packet. The set-top-box may further include a second module configured to modify particular DCT coefficients of the at least one video packet that exhibit a matrix column or row index value greater than a threshold value to zero magnitude, wherein the threshold value defines allowable spatial frequencies of video content within the at least one video packet and is associated with the export of packetized content from the set-top-box to a different computing system. The set-top-box may still further include a third module configured to generate a particular video packet, the video packet comprising particular DCT coefficients modified by the second module and including DCT coefficients of finite magnitude associated with allowable spatial frequency content, and DCT coefficients of zero magnitude associated with disallowable spatial frequency content.

DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

DETAILED DESCRIPTION

Figure 1:
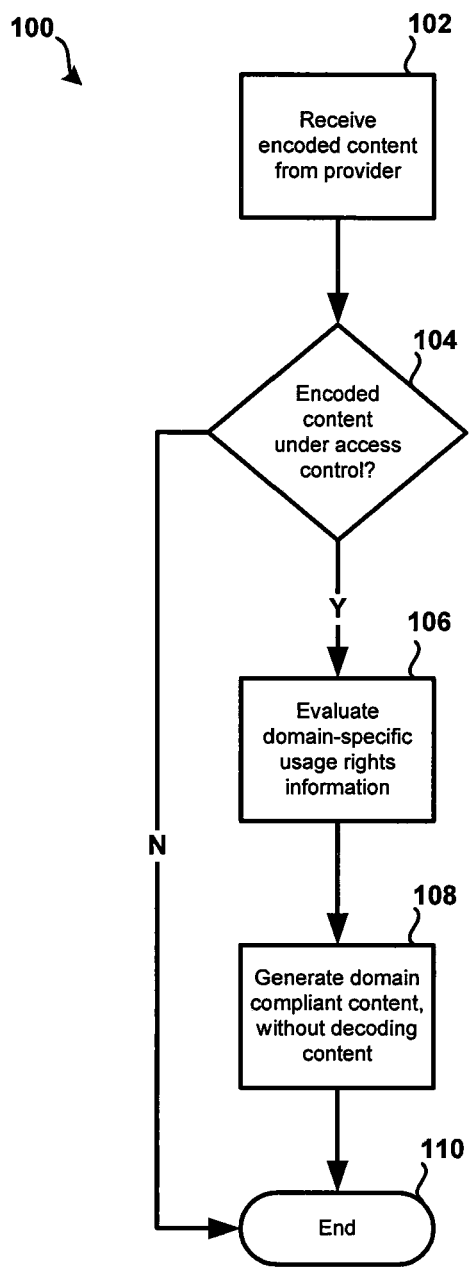
FIG. 1 illustrates an example method for generating domain-compliant image data.

The present disclosure is directed to systems and methods for transforming live or recorded HD (High-Definition) content into reduced resolution content based on domain-specific usage rights. In one aspect, the term "resolution" may refer to a greatest spatial frequency that is resolvable within particular content (e.g., an image), as opposed to pixel count. The reduced resolution content may subsequently be transferred between particular computing systems or devices without violating the usage rights. Although described in the context of a satellite-based content distribution system, the various aspects of the present disclosure may generally be applicable to any scenario in which it is desirable to maximize the allocation of computing system or device resources, and/or dynamically tailor particular electronic content to comply with one or more prevailing standards, laws, rules, regulations, and guidelines. For example, and referring now to FIG. 1, a method 100 for generating domain-compliant image data is shown in accordance with the principles of the present disclosure.

The example method 100 includes receiving (module 102), by a computing system, encoded and/or electronically scrambled HD content from a particular HD content provider. For example, the computing system may receive an encoded bitstream, program stream, transport stream, or other type of data stream, from a particular satellite broadcaster that at least provides HD content. For example, HD video content may be at least packetized (e.g., in accordance with the MPEG-2 TS standard) and encoded (e.g., in accordance with one of the MPEG-2 ASP, MPEG-4 AVC/H.264, VC-1 standards) within a transport stream in accordance with a particular standard. In this example, particular data packets within the transport steam comprising HD video content may be uniquely identified by a particular video PID (Packet Identifier). In this manner, the computing system may resolve and aggregate many related data packets for the purpose of reconstructing particular HD content, such as a television program and the like. An example of such a scenario is described in further detail below in connection with FIG. 2. Other embodiments are however possible, and in certain embodiments a mechanism for resolving and aggregating particular HD content may be implementation specific. For example, encoded HD content may be received from any type of HD content provider including, but not limited to, terrestrial broadcasters, cable broadcasters, DVDs (Digital Video Discs), and many other providers such as, for example, managed IP delivery (e.g., via DVB-IPTV) and unmanaged IP delivery (e.g., via "Over the Top" service). In another example, encoded and/or electronically scrambled HD content may be received or otherwise retrieved by a particular computing system from a particular local memory location. Still other embodiments are possible.

The method 100 further includes determining (module 104), by the computing system, whether the received HD content (see module 102) has sufficient permission(s) to be directly (e.g., without modification) exported to another particular computing system or device in HD format, or whether the received HD content is restricted under some type or form of "access control" in which, for example, image resolution reduction of the HD content should be, or is required to be, performed prior to being exported to another particular computing device. Such "access control" may be performed to ensure that particular access or usage rights are adequately or properly observed. For example, in the scenario of a previously recoded electronically scrambled copy of HD content, a particular parameter within the HD content, data packet(s) associated with the HD content, and may be private and/or proprietary, may indicate that only a single electronically scrambled copy of the HD content may exist. An example of such a parameter includes the "FTA_content_management_descriptor" as set forth within the *Digital Video Broadcasting (DVB); Specification for Service Information (SI) in DVB System* (ETSI EN 300 468 V1.9.1 2009 March) specification. In this example, and when it desired to create another copy of HD content possibly for export to a particular computing device, a determination may be made that image resolution reduction should be performed on associated HD video content to ensure that certain usage rights are heeded or followed. For example, certain usage rights may require that the HD video content be "down-converted" into SD video content as a copy of the HD content is made. Since the SD video content is no longer HD by form and definition, the SD video content may in certain instances be directly exported to another particular computing system without consideration of prevailing usage rights. In this manner, a provider of the HD content may be afforded a mechanism to protect the HD content, while at the same time a consumer may be provided the option to access HD content in a reduced resolution format. Such an implementation is beneficial in many respects. For example, the consumer would not be required to purchase, download, stream, record, or store two distinct copies of particular content.

In yet another example, a particular parameter within the received HD content may indicate that the HD content, or data packet(s) associated with the HD content, must in all circumstances be fully electronically scrambled in which the same is to be exported to another particular computing system or device in HD format. For example, in a first scenario a particular parameter within the HD content may require that export of the HD content for displays (e.g., for television display) conform(s) to the HDMI (High-Definition Multimedia Interface) with HDCP (High-bandwidth Digital Content Protection). In a second scenario, a particular parameter within data packet(s) associated with the HD content may require that export of the HD content for streaming files (e.g., for streaming HD content to a laptop over a home network) conform(s) to the DLNA (Digital Living Network Alliance) with DTCP-IP (Digital Transmission Copy Protection over Internet Protocol) standard. In these two example scenarios, however, the particular computing system or device may not be adequately configured to support data transfer in accordance with the HDMI/HDCP and/or DLNA/DTCP-IP standards. Thus, similar to the scenario of previously recoded copy of HD content as described above, a determination may be made that image resolution reduction (e.g., down-conversion to SD video content) should be, or is required to be, performed on respective HD video content to ensure that particular usage rights are observed.

Operational flow within the method 100 terminates (module 110, described further below) when it is determined (see module 104) that received HD content does in fact have sufficient permission(s) to be directly exported to another particular computing system or device in HD format. Otherwise, the method 100 further includes evaluating (module 106), by the computing system, domain-specific usage rights associated with the received HD content. The domain-specific usage rights may be evaluated at least for the purpose of identifying a maximum allowable spatial frequency content that a modified, or down-converted, version of particular HD content is permitted to exhibit or contain when exported to a particular computing device. In general, usage rights may be "domain-specific" because the usage rights may, in one embodiment, vary based on type and configuration of a particular content provider (e.g., cable broadcasters, DVDs, etc.) and/or type of prevailing standard (e.g., national standard, international standard, proprietary standard, etc.) possibly in combination with one or more prevailing laws, rules, regulations, and/or guidelines. In this manner, the maximum allowable spatial frequency content may be quantified as a function of one or both of a source of corresponding HD content, and a prevailing control otherwise enforced for the purpose of protecting the HD-content content from unauthorized use or usage. Further, in the present example, a particular standard, law, rule, regulation, and/or guideline may be "prevailing" based on any number of factors such, for example, territory in which export of particular HD content is expected to occur, current state of one or controlling authorities, and other factors as well. Particular usage rights may specifically refer to a domestic video format. For example, in the United Kingdom, a limit may correspond to D1 "PAL"=720×576 pixels; in the United States, a limit may correspond to D1 "NTSC"=720×480 pixels or square-pixel "NTSC"=640×480. Other limits include 520,000 pixels per frame, and 320,000 pixels per frame, and 350,000 pixels per frame. Allowable spatial frequencies may be calculated directly from such pixel resolutions. For example, a 480-line video may not store more than 240 cycles per picture height.

While many usage rights may be written in terms of pixel count, usage rights may also state that, having reduced a particular image to that pixel count, the image may then be upscaled to another pixel count when desired. For example, 1920×1080 content may be reduced to 720×480 content, and then upscale back to 1920×1080 content. In this example, the original 1920×1080 content may be considered HD, the 720×480 content may be considered SD, and the upscaled 1920×1080 content, while having the pixel count of HD, may appear as "blurry" as the SD content, or "SD-like." Thus, the SD-like version may be created by "filtering" the original HD content, without requiring downscale to the 720×480 content. In accordance with the present disclosure, this may wholly be performed within, for example, with a DCT (Direct Cosine Transform) domain, as described in further detail below.

The method 100 further includes generating (module 108), by the computing system, domain-compliant content by removing disallowable spatial frequency content from received HD content (see module 102). In the present example, this is performed in view of particular domain-specific usage rights information (see module 106). Such an operation may correspond to down-converting HD video content into SD video content, or "SD-like" video content. In general, "SD-like" may refer to HD pixel-count content that appears as if it has been upscaled from SD (i.e., particular HD content may appear as "blurry" as SD), and in the present example, SD video content may be "SD-like" because the definition of SD video content may be a variable function of "domain-specific" usage rights, described further below. Further, in accordance with the principles of the present disclosure, the down-converting of HD video content into SD or SD-like video content is performed directly on encoded HD video content. More specifically, domain-compliant content may be generated without "fully" or "completely" decoding the HD content (i.e., "directly"). For example, and assuming for the sake of discussion that particular HD video content is encoded in accordance with the MPEG-2 standard (the following example embodiment may be applicable to any number of image encoding/compression techniques or standards), a particular encoded HD video data packet may be "deconstructed" or otherwise "unpacked" or "disassembled" to the extent that all DCT (Direct Cosine Transform) coefficients are accessible. In the example embodiment, other elements of the HD video data packet (e.g., motion vectors, etc.) may be considered ancillary for the intended purpose, and thus need not be considered, decoded, operated on, deconstructed, unpacked, disassembled, etc.

In the context of images, and as described in further detail below in connection with FIG. 4, DCT coefficients may represent or otherwise quantify magnitude, and thus energy, of DC and AC spatial frequency content within a subset of pixels of a particular HD image (e.g., an 8×8 block of pixels selected from a particular 1080p, 1080i, 720p, etc., HD image). In the present example, domain-compliant content may be generated by removing or otherwise modifying particular DCT coefficients that represent spatial frequencies within the particular HD image that are greater than a particular SD resolution limit. Spatial frequencies greater than the particular SD resolution limit may correspond to HD-like spatial frequencies. In this manner, a particular encoded HD video packet may be converted to SD-like resolution by removing or otherwise modifying particular DCT coefficients. More specifically, respective HD video content may down-graded when spatial frequencies greater than a threshold value defined by a SD resolution limit are removed from the HD video content. Following removal, or at least modification thereof as described further below, of particular DCT coefficients, a particular encoded HD video data packet may be "reconstructed" or otherwise "repacked" or "reassembled" to the extent that all modified DCT coefficients are reinserted therein. In this manner, a modified, reduced image resolution (i.e., SD-like) video data packet is formed. And, since the reduced image resolution video data packet is HD in regards to pixel count only, and no longer contains any of the information, resolution, or sharpness beyond that which is present in an SD image, the modified video data packet may be directly exported (e.g., see module 110) to another particular computing system without consideration of prevailing domain-specific usage rights.

Such an implementation as discussed in reference to FIG. 1 may be beneficial in many respects, including at least maximizing allocation of computing resources as part of generating domain-compliant image data, as well as adaptively populating spatial frequency content within particular domain-compliant image data on a "per-domain" basis. More specifically, computational power required to generate domain-compliant image data may be lessened or minimized because the down-converting of HD video content into reduced resolution content is performed directly on encoded HD video content, without decoding the HD video content. Computational savings may reach, for example, 90% when compared to typical transcoding techniques that require full decode, then downscale, and then full re-encode when transforming particular HD content into reduced resolution content. Additionally, spatial frequency content of domain-compliant image data may be tailored on a "per-domain" basis because in each instance such data is generated, prevailing usage rights are evaluated to identify a "domain-specific" threshold value that defines a "domain-specific" SD resolution limit. The "domain-specific" SD resolution limit may be variable because it may be a function of type and configuration of a particular content provider and/or type of prevailing standard possibly in combination with one or more prevailing laws, rules, regulations, and/or guidelines, as described above.

Further scenarios and beneficial aspects associated with transforming live or recorded HD content into reduced resolution content based on domain-specific usage rights are described below in connection with FIGS. 2-6.

Figure 2:
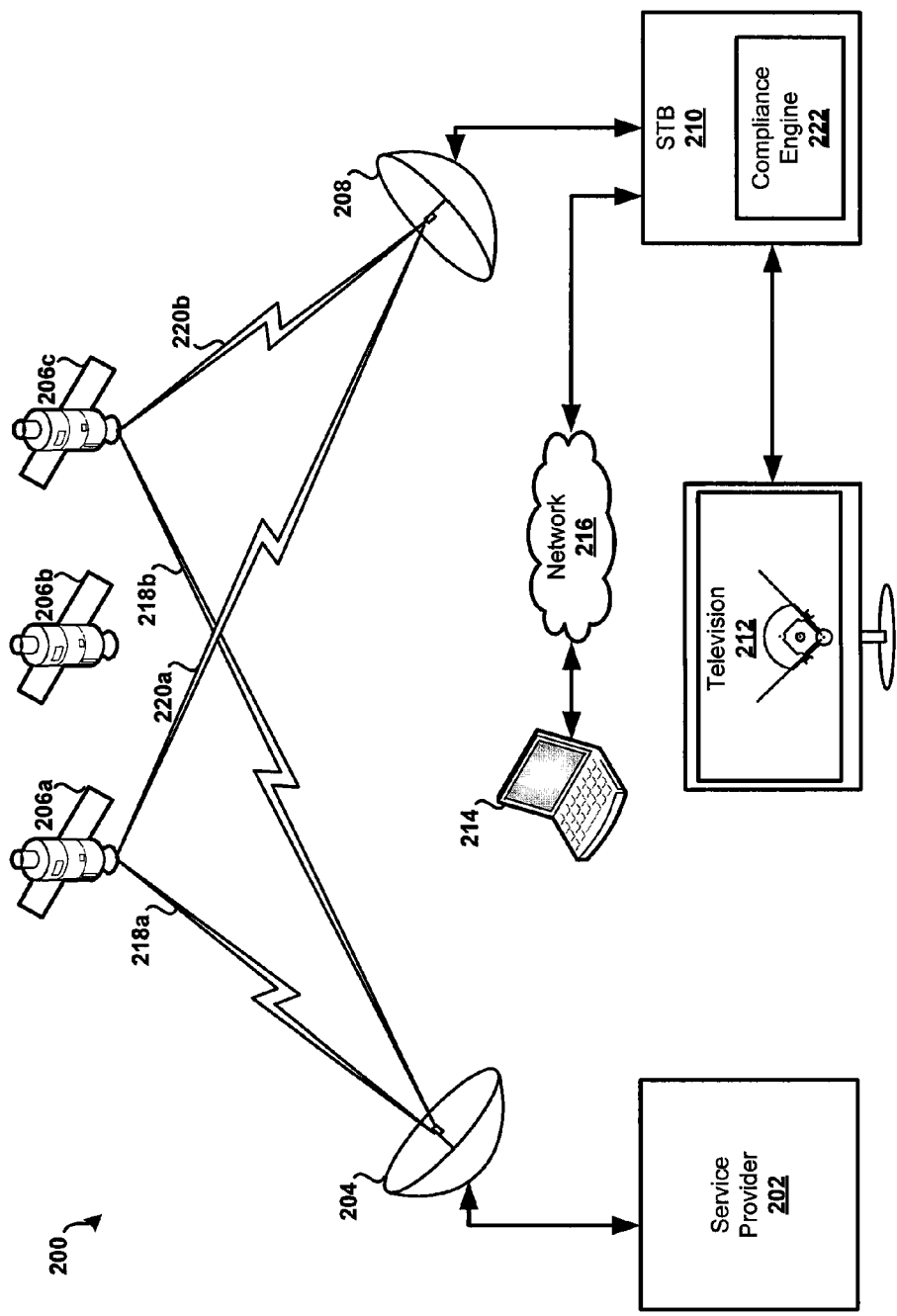
FIG. 2 illustrates an example satellite-based content distribution system.

Referring now to FIG. 2, a satellite-based content distribution system 200 is shown. For the sake of brevity, the example system 200 is depicted in simplified form, and may generally include more or fewer systems, devices, networks, and other components as desired. Further, number and type of features or elements incorporated within the system 200 may or may not be implementation specific, and at least some of the aspects of the system 200 may be similar to a cable television distribution system.

In the present example, the system 200 includes a service provider 202, a satellite uplink 204, a plurality of orbiting (e.g., geosynchronous) satellites 206a-b (collectively, "satellites 206"), a satellite dish 208, a STB (Set-Top Box) 210, a television 212, and a laptop 214. The system 200 also includes an example network 216 that establishes a bi-directional communication path for data transfer between the STB 210 and the laptop 214. In general, the network 216 may incorporate or exhibit terrestrial and/or non-terrestrial network features or elements. For example, in one embodiment the network 216 may be any of a number of wireless or hardwired packet-based communication networks such as, for example, WAN (Wide Area Network), WLAN (Wireless Local Area Network), Internet, or other types of communication networks such that data may be transferred among respective elements of the example system 200. Other embodiments are possible.

In practice, the satellites 206 may be configured to receive uplink signals, such as uplink signals 218a-b, from the satellite uplink 204. In this example, the uplink signals 218a-b may contain one or more transponder streams of particular data or content (e.g., a particular television channel) that is supplied by the service provider 202. For example, each of the respective uplink signals 218a-b may contain various encoded HD television channels, various SD television channels, on-demand programming, programming information, and/or any other content in the form of at least one transponder stream and in accordance with an allotted carrier frequency and bandwidth. In this example, different television channels may be carried using different ones of the satellites 206. Different television channels may also be carried using different transponders of a particular satellite (e.g., satellite 206a); thus, such television channels may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a.

The satellites 206 may further be configured to relay the uplink signals 218a-b to the satellite dish 208 as downlink signals, such as downlink signals 220a-b. Similar to the uplink signals 218a-b, each of the downlink signals 220a-b may contain one or more transponder streams of particular data or content, such as various encoded and/or electronically scrambled television channels, on-demand programming, etc., in accordance with an allotted carrier frequency and bandwidth. The downlink signals 220a-b, however, may not necessarily contain the same content as a corresponding one of the uplink signals 218a-b. For example, the uplink signal 218a may include a first transponder stream containing at least a first group of television channels, and the downlink signal 220a may include a second transponder stream containing at least a second, different group of television channels. In other examples, the first and second group of television channels may have one or more television channels in common. In sum, there may be varying degrees of correlation between the uplink signals 218a-b and the downlink signals 220a-b, both in terms of content and underlying characteristics.

Continuing with the above simplified example, the satellite dish 208 may be provided for use (e.g., on a subscription basis) to receive television channels provided by the service provider 202, satellite uplink 204, and/or satellites 206. For example, the satellite dish 208 may be configured to receive particular transponder streams, or downlink signals (e.g., downlink signals 220a-b), from the satellites 206. Additionally, the STB 210, which is communicatively coupled to the satellite dish 208, may subsequently select via tuner, for example, and relay particular transponder streams to one or both of the television 212 and the laptop 214, for display thereon. For example, the satellite dish 208 and the STB 210 may, respectively, be configured to receive and relay at least one premium HD-formatted television channel to the television 212. In this example, the premium HD channel may be output to the television 212 from the STB 210 in accordance with the HDMI/HDCP content protection technologies. In another example, the satellite dish 208 and the STB 210 may, respectively, be configured to receive and relay the premium HD channel to the laptop 214. In this example, the premium HD channel may be output to the laptop 214 from the STB 210 in accordance with the DLNA/DTCP-IP content protection technologies. Other embodiments are possible.

In both of the above HDMI/HDCP and DLNA/DTCP-IP examples, usage rights associated with the viewing of the premium HD-formatted television channel may be adequately preserved or otherwise observed. In general, this is because, in both scenarios, the output of the premium HD-formatted television channel from the STB 210 is electronically scrambled in accordance with a particular standard, in an effort to protect the premium content from unauthorized use or usage. In many instances, however, one or both of the television 212 and the laptop 214 may not be adequately configured to prevent unauthorized access to the premium HD-formatted television channel. For example, the laptop 214 may not be configured to support any type of electronically scrambled information, much less the DLNA/DTCP-IP content protection technologies. In such a scenario, and in accordance with the principles of the present disclosure, a compliance engine 222 may be configured to reduce at least the video resolution of the premium HD-formatted television channel so that content associated with the premium HD-formatted television channel may be transferred to the laptop 214 without violating particular usage rights.

Figure 3:
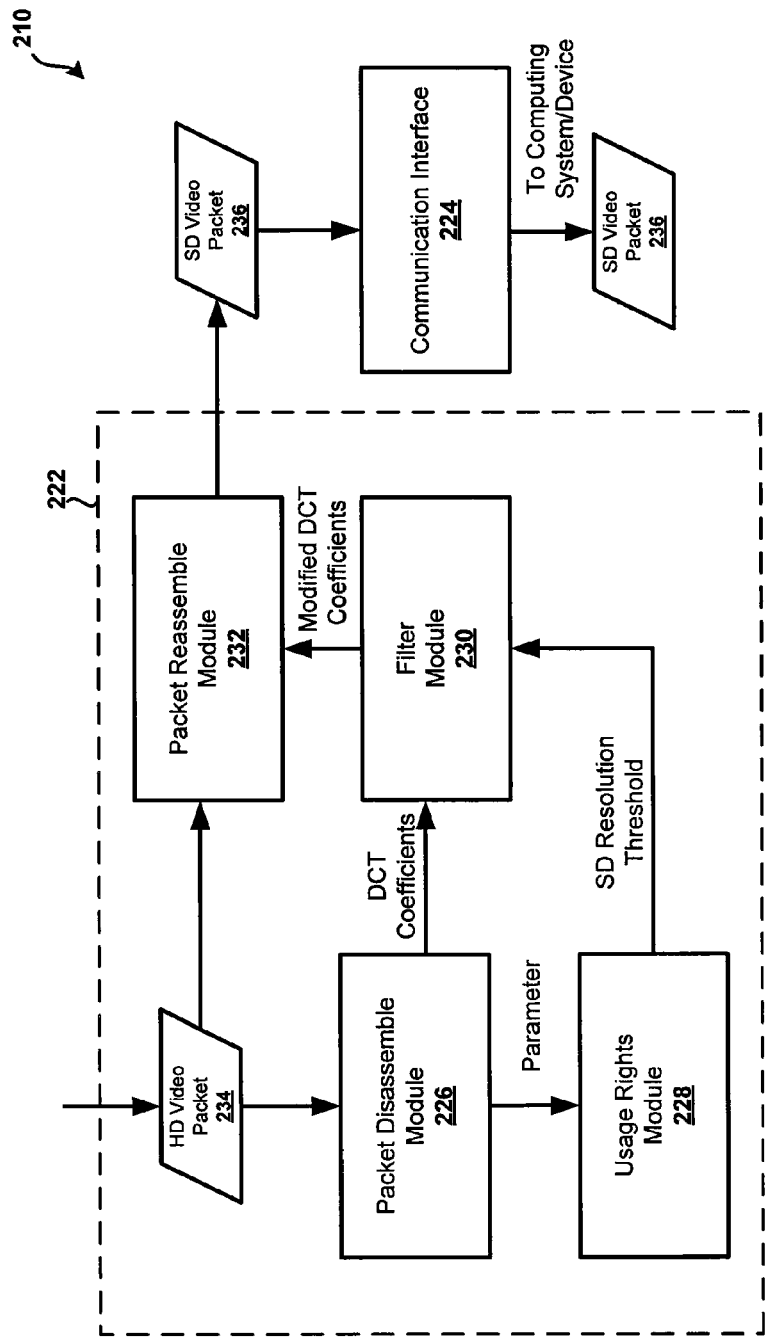
FIG. 3 illustrates a simplified block diagram of an example set-top-box.

For example, referring now additionally to FIG. 3, a simplified block diagram of the STB 210 of FIG. 2 is shown including the compliance engine 222 and a communication interface 224. For brevity, a number of other elements of the STB 210 are omitted from the present discussion. In an actual implementation, however, the STB 210 may be configured to include any number of other components or modules, and such components or modules may or may not be implementation specific. For example, the STB 210 in certain implementations may be configured to include various components implemented in hardware, software, firmware, or any combination thereof such as, a tuner, an EPG (Electronic Programming Guide), at least one device and/or user interface, a NIT (Network Information Table), a DVR (Digital Video Recorder), a demultiplexer, a smart card, a decryption engine, and other various modules or components.

In the present example, the compliance engine 222 may include a packet disassemble module 226, a usage rights module 228, a filter module 230, and a packet reassemble module 232. In some implementations, some of these features may be provided as part of an existing Conditional Access System. In the present example, the communication interface 224 of the STB 210 may be configured to enable the transfer of data or information with and between compatibly configured devices via multiple different communication channels, and types of communication channels, some of which may be implementation specific. For example, and referring intermittently to FIG. 2, the communication interface 224 may be configured to communicate or otherwise exchange information with the laptop 214 over the network 216, as described above. In another example, while a primary communication channel may exist between the STB 210 and the service provider 202 via satellites 206 (which may be unidirectional to the STB 210), the communication interface 224 may be configured to communicate or otherwise exchange information with the service provider 202 over a network (not shown), similar to the network 216. In still another example, such as a "plug and play" scenario, the communication interface 224 may be configured to communicate or otherwise exchange information with any type or variety of peripheral computing device such as, for example, a USB (Universal Serial Bus) device, a removable memory card, a smartphone device, a video game console, and many others. Still other embodiments of the communication interface 224 are possible.

In practice, the packet disassemble module 226 may receive a HD video packet 234. In one embodiment, the HD video packet 234 may have originated from a particular satellite broadcaster, where the HD video packet 234 may have been at least packetized and encoded within a transport stream in accordance with a particular encoding and data compression standard (e.g., MPEG, SMPTE 421M, etc.). Upon receipt of the HD video packet 234, the packet disassemble module 226 may "unpack" the HD video packet 234, and recover all DCT coefficients within the HD video packet 234, along with a particular parameter (e.g., "FTA_content_management_descriptor") that may be used identify domain-specific usage rights associated with the received HD video packet 234. For example, the particular parameter may be passed to the usage rights module 228 which may select, from a list for example, an associated threshold value that defines a SD resolution limit which quantifies a maximum allowable spatial frequency content that a modified, or down-converted, version of the HD video packet 234 is permitted to exhibit or contain when exported to a particular computing device.

Upon identification thereof by the usage rights module 228, the SD resolution limit or threshold may be passed to the filter module 230. In addition, the DCT coefficients as recovered by the packet disassemble module 226 from the HD video packet 234 may be passed to the filter module 230. Upon receipt of the SD resolution threshold and respective DCT coefficients, the filter module 230 may apply a filtering operation that at least modifies all DCT coefficients that represent disallowable spatial frequency content within a particular domain associated with the SD resolution threshold. For example, the filter module 230 may implement a stop-band filter to quantize to zero (0) magnitude all DCT coefficients having a basis function that represents a spatial frequency greater than the SD resolution threshold. In addition, and as described in further detail below, the filter module 230 may implement one or both of a pass-band filter and a transition-band filter such that when converted to the spatial domain, an image associated with DCT coefficients as modified by the filter module 230 may appear to have "softened edges," as opposed to having edges displaying perceivable "ringing artifacts" that may manifest as a ghosting pattern and the like.

Upon respective filtering by the filter module 230, all "filtered" DCT coefficients, either modified or non-modified, may be passed to the packet reassemble module 232. Upon receipt of the filtered DCT coefficients the packet reassemble module 232 may "repack" the filtered DCT coefficients into the HD video packet 234 to form a SD video packet 236. In this manner, the HD video packet 234 is down-converted to a reduced resolution. For example, at least all DCT coefficients having a basis function that represents a spatial frequency greater than the above-mentioned SD resolution threshold may be replaced or quantized to zero (0) magnitude. Both the HD video packet 234 and the SD video packet 236 though describe a video signal with the same number of pixels. For example, both the HD video packet 234 and the SD video packet 236 may have a pixel count of 1920×1080 pixels. Spatial frequencies (e.g., equivalent to perceptible and measurable actual resolution) above the SD resolution threshold have been removed. Additionally, as described in further detail below, all DCT coefficients having a basis function that represents a spatial frequency less than the SD resolution threshold, but relatively close in energy to the SD resolution threshold, may be replaced or quantized to a magnitude less than a magnitude of a corresponding original DCT coefficient. Such an implementation is beneficial in many respects including at least softening "ringing artifacts" in the spatial domain as mentioned above.

Upon forming or generation thereof by the packet reassemble module 232 the SD video packet 236 may be passed to the communication interface 224. In this example, the SD video packet 236 may be exported according to any of a number of supported communication channels. For example, the SD video packet 236 may be exported to the laptop 214 via network 216, as described above. In another example, the SD video packet 236 may be exported to a USB device via a USB port. In both examples, since the SD video packet 236 no longer includes HD spatial frequencies, the SD video packet 236 may be directly exported to the laptop 214 over the network 216, for example, without consideration of prevailing domain-specific usage rights.

As mentioned above in connection with FIG. 3, the filter module 230 may be configured to implement multiple filtering operations on DCT coefficients of a particular HD video packet (e.g., HD video packet 234). Referring now to FIG. 4, an example matrix operation for generating domain-compliant image data is shown. In particular, FIG. 4 illustrates an example weighting matrix 402, an example DCT coefficient matrix 404, and an example modified DCT coefficient matrix 406. In this example, each respective block of the DCT coefficient matrix 404 may correspond to a particular DCT basis function that represents DC or a particular AC spatial frequency. For example, a basis function associated with block (0,0) of the DT coefficient matrix may represent DC spatial frequency, a basis function associated with block (0,8) may represent a very "high" horizontal AC spatial frequency, a basis function associated with block (8,0) may represent a very "high" vertical AC spatial frequency, and a basis function associated with block (8,8) may represent a very "high" combination of vertical and horizontal AC spatial frequencies, somewhat like a fine checkerboard pattern. Additionally, each respective block of the DCT coefficient matrix 404 may be assigned an integer value that quantifies the strength or energy of the corresponding particular DC or AC spatial frequency. In general, the integers may range from −1024 to 1023. These integer values correspond to DCT coefficients. However, codecs based on different bitdepths (e.g., 8-bit, 12-bit, etc.) and implementations based on different numerical formats (e.g., signed integers, unsigned integers, floating point, logarithmic, etc.) may use different ranges and/or values to represent DCT coefficients.

Figure 4:
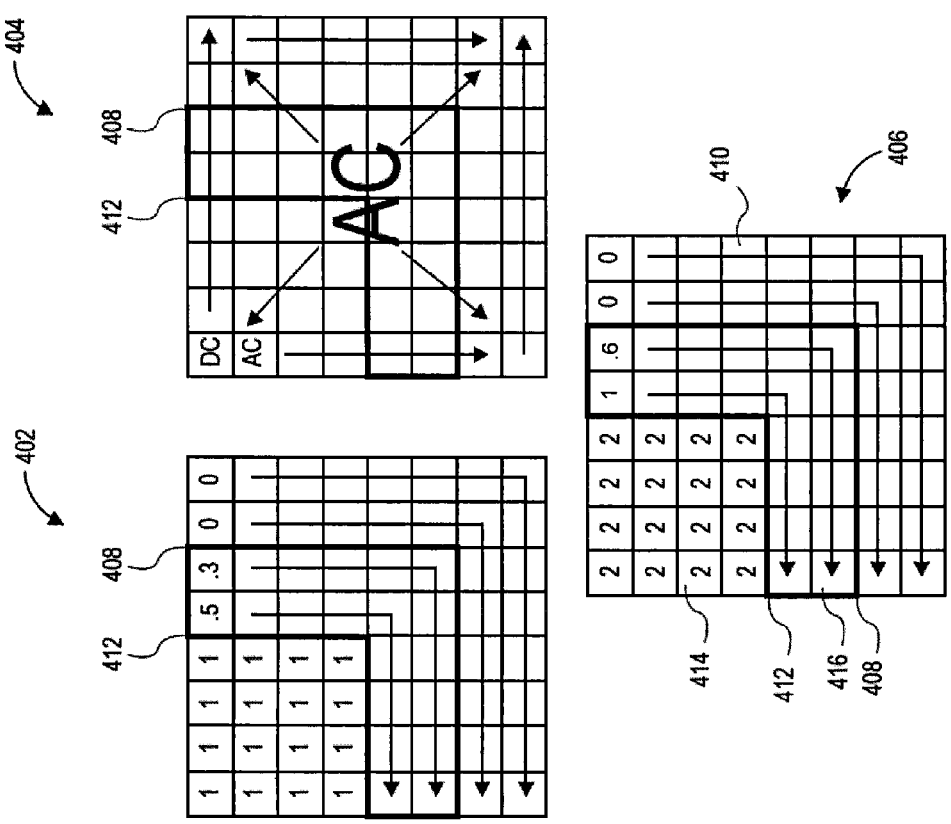
FIG. 4 illustrates an example matrix operation for generating domain-compliant image data.

Still referring to FIG. 4, a SD resolution threshold 408 of the DCT coefficient matrix 404 may define a maximum allowable spatial frequency content that a modified, or down-converted, version of HD video content is permitted to exhibit or contain when exported to a particular computing device, such as described above in connection with FIGS. 1-3. In this example, all DCT coefficients having either a row or column index value greater than or equal to seven (7) may be identified as having disallowable spatial frequency content. For example, block (1,7) and block (7, 1) may be identified as having a disallowable spatial frequency content. However, other thresholds are possible. For example, in some implementations, a preferred transition may occur with a common row or column index value of three (3). In other implementations, a preferred transition may occur with a common row or column index value of four (4). In other implementations, a preferred transition may occur with a common row or column index value of five (5). Mapping the SD resolution threshold 408 to the weighting matrix 402, it is shown that all blocks having either a row or column index value greater than or equal to seven (7) are populated with integer value zero (0). Element-by-element matrix multiplication (i.e., "Hadamard") of the DCT coefficient matrix 404 by the weighting matrix 402 may thus quantize all DCT coefficients having either a row or column index value greater than or equal to seven (7) to zero (0) magnitude, as shown by the modified matrix 406. The corresponding section of the modified matrix 406 may be referred to as a stop-band 410, and a filter operation associated with the stop-band 410 may be referred to as a stop-band filter.

By similar logic, a pass-band threshold 412 of the DCT coefficient matrix 404 may define a maximum allowable spatial frequency content that a non-modified, or non-converted, version of HD content is permitted to exhibit or contain when exported to a particular computing device. In other words, such spatial frequency content may correspond to typical SD content. In this example, all DCT coefficients having either a row or column index value less than or equal to four (4) are identified as having spatial frequency content that may remain in unmodified form. For example, block (1,4) and block (4,1) are identified as having such allowable spatial frequency content. Mapping the pass-band threshold 412 to the weighting matrix 402, it is shown that all blocks having either a row or column index value less than or equal to four (4) are populated with integer value one (1). Element-by-element matrix multiplication of the DCT coefficient matrix 404 by the weighting matrix 402 may thus map all DCT coefficients having either a row or column index value less than or equal to four (4) as an unchanged value, as shown by the modified matrix 406 where, for simplicity, it is assumed in this example that all DCT coefficients are originally quantized to two (2). The corresponding section of the modified matrix 406 may be referred to as a pass-band 414, and a filter operation associated with the pass-band 414 may be referred to as a pass-band filter.

In some embodiments, the pass-band threshold 412 of the DCT coefficient matrix 404 may approach the SD resolution threshold 408. For example, the pass-band threshold 412 and the SD resolution threshold 408 may correspond to a similar value and thus be coincident. Continuing with the above-example, matrix operation of the DCT coefficient matrix 404 by the weighting matrix 402 may still quantize all DCT coefficients having either a row or column index value greater than or equal to seven (7) to zero (0) magnitude. However, element-by-element matrix multiplication of the DCT coefficient matrix 404 by the weighting matrix 402 may quantize or map all DCT coefficients having either a row or column index value less than seven (7) to their original unchanged values (not shown). An equivalent operation may be to copy or retain the wanted coefficients and delete or "zero" unwanted coefficients. Such a filtering operation may be referred to as a brick-wall filter. In general, a brick-wall filter operation may introduce perceivably undesirable artifacts when observed in the spatial domain. For example, a "ringing artifact" may be observed in the spatial domain (i.e., when viewing a particular image associated with the DCT coefficient matrix 404) that when viewed closely may appear as amorphous, ghost-like images near lines within the particular image (e.g., a blade of grass) that would otherwise appear sharply defined in HD. To address such undesirable effects, the pass-band threshold 412 may be defined to differ from the SD resolution threshold 408, such as shown in FIG. 4. In this example, a smoothing or transition-band 416 is shown in the modified matrix 406.

For example, as shown in FIG. 4, all DCT coefficients having either a row or column index value greater than four (4) and less than seven (7) may be identified as having allowable spatial frequency content. However, in the weighting matrix 402 it is shown that all DCT coefficients having either a row or column index value greater than four (4) and less than seven (7) are populated with integer value less than one (1) but greater than zero (0). Element-by-element matrix multiplication of the DCT coefficient matrix 404 by the weighting matrix 402 in this example may thus quantize all DCT coefficients having either a row or column index value greater than four (4) and less than seven (7) to a finite magnitude less than a magnitude of a corresponding original DCT coefficient, as shown by the modified matrix 406, where, for simplicity, it is assumed in this example that all DCT coefficients to two (2). As mentioned above, the corresponding section of the modified matrix 406 may be referred to as a transition-band 416, and a filter operation associated with the transition-band 416 may be referred to as a smoothing filter for example. Additionally, a transfer function associated with the transition-band 416 may be of any form as desired such as, for example, power-law, exponential, logarithmic, raised-cosine, linear, weighted, etc. For example, as shown in FIG. 4, a transfer function associated with the transition-band 416 is of the form 1/x. For example, block (1,5) of the modified matrix 406 is scaled by a value of (0.5) and block (1,6) of the modified matrix 406 is scaled by a value of (0.3), etc. Such an implementation is beneficial in that an image associated with modified, transition-band DCT coefficients of the modified matrix 406 may appear to have "softened edges," as opposed to having edges displaying perceivable "ringing artifacts," as discussed above.

Figure 5:
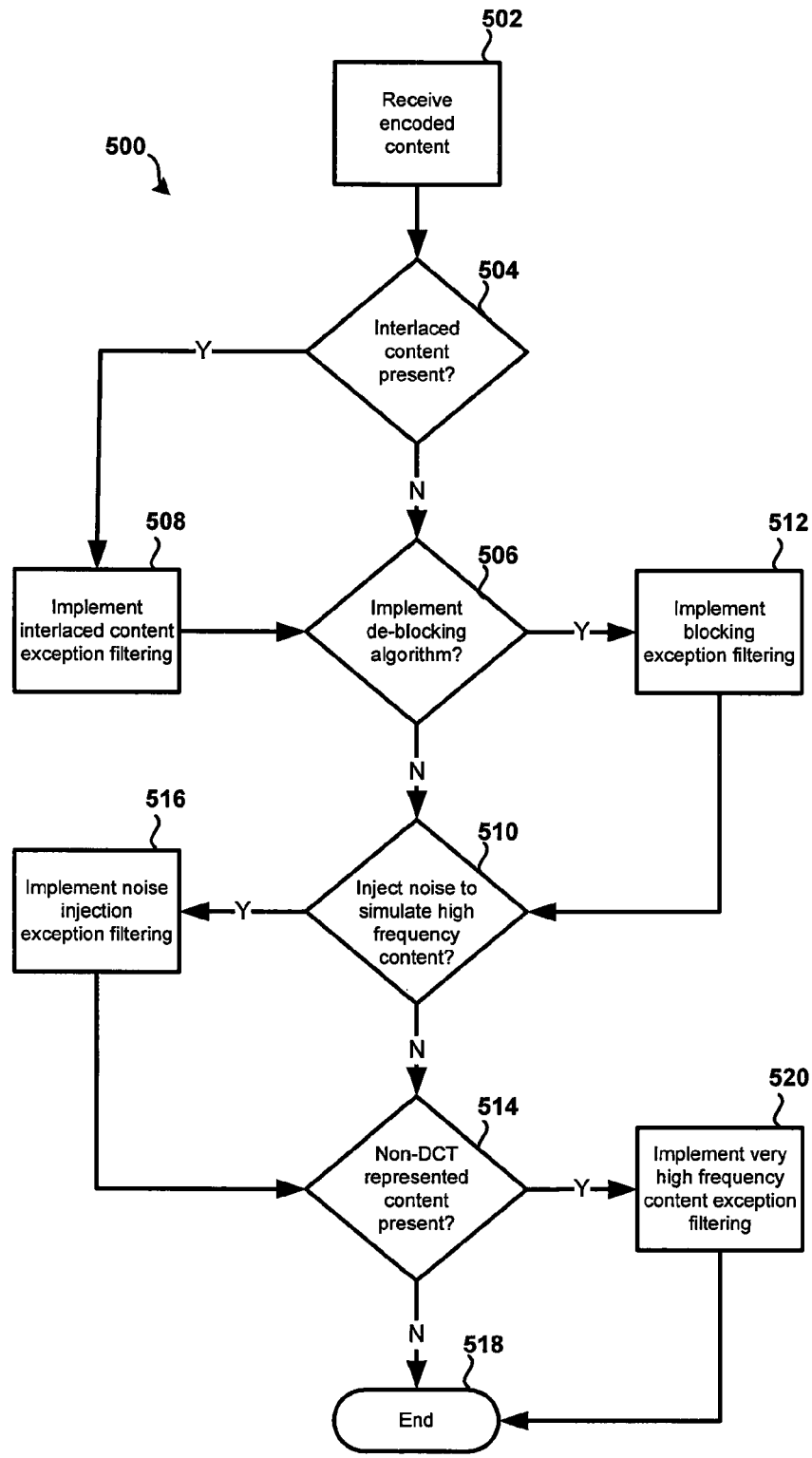
FIG. 5 illustrates an example method for implementing exception filtering for generating domain-compliant image data.

Referring now to FIG. 5, an example method 500 for implementing exception filtering for generating domain-compliant image data is shown. In general, the example method 500 may wholly or at least partially incorporated into the example method 100 of FIG. 1 for the purpose of handling one or more issues that may potentially be encountered in generating domain-compliant image data as described throughout. In one embodiment, the example method 500 is implemented by the STB 210 of FIG. 2. However, other embodiments are possible.

At operation 502, encoded HD content is received from a particular HD content provider. For example, the STB 210 may receive an encoded transport stream from a particular satellite broadcaster that at least provides HD content. The HD video content may be packetized, and encoded within the transport stream in accordance with a particular MPEG standard. Other embodiments are possible.

At operation 504, an evaluation may be made to determine whether the received HD content is associated with interlaced video. In the context of interlaced video, a particular video frame does not consist of a single picture. Rather the particular video frame may consist of two separate pictures woven together into a single frame. The two separate pictures may be referred to as "fields." In general, two associated fields may represent an image at slightly different moments in time, the first field for example being captured and displayed about 20 milliseconds or about 17 milliseconds before the second field. Accordingly, while there may be 25 frames per second or about 30 frames per second, there may be 50 fields per second or about 60 fields per second. Additionally, information in the first field may correspond to lines 1, 3, 5, 7, etc., of the single frame, while information in the second field may correspond to lines 2, 4, 6, 8, etc., of the single frame in accordance with a manner by which the respective fields are captured (i.e., skipping every other line from a video sensor), and also how fields may be displayed on conventional CRT-based televisions.

Modern displays are mostly "progressive" displays, and may de-interlace any interlaced video signal to generate a full 50 or approximately 60 frames per second to send to a display for example. These displays may accomplish this by calculating or predicting "missing" lines from each field. In general, when there is little or no spatial movement, an interlaced frame of a video may look very much like a progressive frame of video, and may be MPEG encoded as a progressive frame. When there is some movement, a particular frame may be split two separate fields, which then may be encoded separately. In other examples, an encoder may recognize movement, and adjust some encoding parameters to optimize encoding of the full frame with the knowledge that the full frame is actually two separate fields, without fully separating the fields themselves. Additionally, some encoders may retain some "field-like" coding when encoding motionless interlaced pictures, and some encoders may retain some "frame-like" coding when encoding moving interlaced pictures. In still further examples, some encoders may use an entirely incorrect mode for encoding interlaced pictures. In sum, there may be substantial variability when encountering interlaced video.

When an evaluation at operation 504 is in the negative, process flow may proceed to operation 506. When an evaluation at operation 504 is in the affirmative, process flow may proceed to operation 508. Here, in the context of interlaced video, operation 508 may address the above-mentioned variability (e.g., incorrect encoding) by, for example, only filtering horizontal resolution (e.g., via filter module 230) of particular encoded content. This may for example be implemented by determining that the particular content is associated with video interlacing, and implementing a DCT filter operation to modify each DCT coefficient associated with horizontal image resolution. For example, this may correspond to only filtering DCT coefficients that occur within column one (1) of the DCT coefficient matrix 404. In this example, a typical resolution restriction that may be required to be met may specify 520,000 total pixels or less. An assumption may be made that this may be the equivalent of 940 pixels×540 pixels=507,600 pixels, or 720 pixels×576 pixels=414,720 pixels. However, it may be equally acceptable to output an equivalent of 480 pixels×1080 pixels=518,400 pixels to meet the resolution requirement. In this example, the interlacing may remain intact, at the expense of more radically reducing horizontal resolution. Other embodiments are possible.

For example, in the DCT domain as described throughout, when video is encoded as fields, reducing the resolution of an interlaced video may be accomplished by separating the video into separate fields and performing a "blurring" operation on the fields. In other words, applying DCT-coefficient zeroing, removal, or scaling as described above, to DCT coefficients for each particular field. When video is encoded as fields when there is movement, and frames when there is none, then applying DCT-coefficient processing to whatever DCT coefficients are stored, trusting that the original encoder has made an appropriate field/frame choice, may yield a video where the picture is more "blurry" during movement than when at rest, but this may be subjectively acceptable. When video contains sequences with "wrong" encoding, and fields are encoded as frames, then vertical "blurring" may blur the two fields, which represent two different moments in time, together. This may create quite an objectionable motion blur, ghosting, and stuttering of movement, and ideally should be avoided. To address such issues, however, an adaptive solution may be performed by understanding the nature of the movement and encoding of the interlaced video, and then filtering DCT coefficients based on the result of this analysis. Still other embodiments are possible.

At operation 506, an evaluation may be made to determine whether to implement a "de-blocking" algorithm. In example embodiments described throughout, by processing 8×8 DCT squares individually without concern for contents of adjacent squares, visible blocking may be introduced where the edges of the DCT blocks no longer share similar pixel values. This may be prevalent where diagonal image components cut across the corners of DCT blocks, appearing as high frequency "dots" at the corner of one DCT block, such dots being removed by the processing. In more advanced codecs, it may be sufficient to trigger a deblocking filter built into the decoder to hide this blocking. For example, in MPEG-4 AVC/H.264, the SEI (Supplemental Enhancement Information) "Deblocking filter display preference" metadata in the stream may be set to cause decoders to apply maximum deblocking (since there are no longer any genuine high frequency components for overaggressive deblocking to damage). In many instances, the blocking may appear at locations where codecs generate similar blocking when being used at too-low a bitrate for given content, and as such, many devices (e.g., televisions) may already have algorithms built into them to detect such blocking, and filter it out automatically—because it is already present in many broadcasts, and broadcasters decrease the bitrate in order to fit more TV channels into a given delivery platform. As such, on many devices, the blocking, even if left uncorrected by the decoder, may be invisible.

Some devices with limited processing power may skip even "mandatory" deblocking in the decoder, and do not apply a deblocking filter for display. Some users disable deblocking filters. When targeting such devices/users, it may be necessary to adjust processing to reduce the visibility of the blocks, for example analyzing the contents of the blocks, and specifically the edges, and maintaining any high frequency DCT coefficients required to prevent the "blockiness" from occurring, while still removing others to reduce the resolution. This is an adaptive, content-based process that may be implemented in accordance with the present disclosure, while still achieving computational savings such as described above. For efficiency, it may be necessary to restrict such processing to the macroblock level (e.g., 16×16 pixels).

When an evaluation at operation 506 is in the negative, process flow may proceed to operation 510. When an evaluation at operation 506 is in the affirmative, process flow may proceed to operation 512. Here, in the context of blocking/de-blocking, operation 512 may for example, implement a "de-blocking" processes by analyzing DCT blocks (e.g., via filter module 230), specifically edges, and maintaining any high frequency DCT coefficients required to prevent "blockiness" from occurring within the spatial domain, while still removing other DCT coefficients to comply with image resolution reduction requirements as described throughout. Accordingly, a process may be implemented at operation 512 to prevent appearance of block-like artifacts within an image associated with the particular DCT coefficients (e.g., 8×8 DCT blocks). Other embodiments are possible.

At operation 510, an evaluation may be made to determine whether to add "low" levels of artificial noise or "grain" that may enhance the appearance of low resolution images and videos, giving a false subjective impression of higher resolution. In the DCT domain, having removed or attenuated high frequency components that are actually present (e.g., to meet usage rights restrictions), it may be desirable to add-in simulated high frequency components that may provide a false subjective impression of fine detail(s) that may otherwise be present in HD. In some instances, various usage rights may state that, following resolution reduction to meet image constraint criteria as described throughout, it is acceptable to further process the image, including sharpening. Adding low level noise such that it is not obviously perceived as noise, but judged to be detail, may thus be an acceptable method of making an image more aesthetically pleasing.

When an evaluation at operation 510 is in the negative, process flow may proceed to operation 514. When an evaluation at operation 510 is in the affirmative, process flow may proceed to operation 516. Here, in the context of injecting noise to simulate high frequency content, operation 516 may address this by setting higher frequency DCT coefficients to random, but relatively "low" magnitude values. In practice, values that are between 20 dB (decibels) and 40 dB below equivalent of peak luminance level may be used, for example, with individual coefficients being chosen to, on their own, represent values towards a lower end of the range (e.g. −30 dB to −40 dB), but such that when all such DCT coefficients are taken together and transformed via an IDCT (Inverse Discrete Cosine Transform), a result noise level may reach an upper end of the range (e.g. −30 dB to −20 dB). Further, exact amplitudes, frequencies, and random distribution of values may be adjusted based on what may potentially be subjectively pleasing, but for simplicity and efficiency would usually be constrained by quantization levels defined for a given coefficient and block in original encoding. Other embodiments are possible.

At operation 514, an evaluation may be made to determine whether any picture information is present other than that which is stored with DCT coefficients. For example, a number of codecs may preserve or simulate very high frequency data which is not efficiently stored in DCT coefficients. For example, the "Film grain characteristics SEI" from the MPEG-4 AVC/H.264 fidelity extensions, where the general nature of the film grain in a 35 millimeter film print, for example, that has been encoded is represented parametrically, and reconstructed in a decoder, rather than being represented in DCT coefficients. However, permitting such high frequency content to pass in situations such as described throughout may violate usage rights.

When an evaluation at operation 514 is in the negative, process flow may proceed to operation 518, corresponding to termination of the example method 500. When an evaluation at operation 514 is in the affirmative, process flow may proceed to operation 520, corresponding to termination of the example method 500. Here, in the context of very high frequency content, operation 516 may address such an issue by, for example, detecting such data within the received encoded content (see operation 502), and either process the encoded content to remove all representation of higher frequency content, for example by removing parameters that correspond to higher frequencies, or remove the encoded content entirely. Other embodiments are possible, and next, at operation 518, the example method 500 terminates.

As discussed throughout, the present disclosure is directed to systems and methods for transforming live or recorded HD content into reduced resolution content based on domain-specific usage rights, where the reduced resolution content may subsequently be transferred between particular computing systems or devices without violating the usage rights. Aspects of the present disclosure however may be applicable in other scenarios as well such as, for example, transforming live or recorded Ultra-HD content into reduced resolution HD content based on domain-specific usage rights. Still other scenarios are possible.

Figure 6:
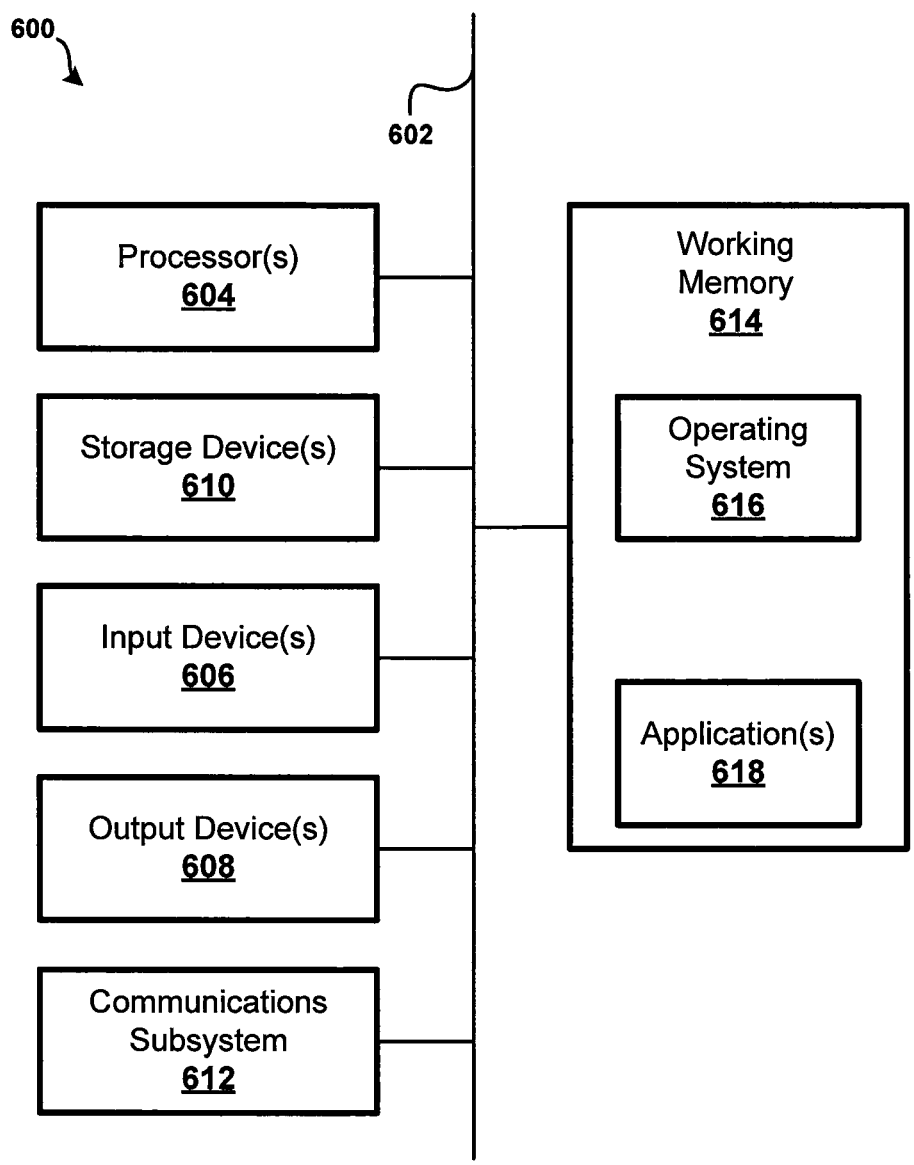
FIG. 6 shows an example computing system or device.

Referring now to FIG. 6, an embodiment of an example computer system or device 600 is shown. An example of a computer system or device includes an enterprise server, blade server, desktop computer, laptop computer, personal data assistant, smartphone, gaming console, set-top-box, and any other type machine for performing calculations. The computer system 600 may be wholly or at least partially incorporated as part of previously-described computing devices, such as the STB 210, television 212, and laptop 214 of FIG. 2. The example computer device 600 may be configured to perform and/or include instructions that, when executed, cause the computer system 600 to perform the method of FIGS. 1 and 6. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer device 600 is shown comprising hardware elements that can be electrically coupled via a bus 602 (or may otherwise be in communication, as appropriate). The hardware elements may include a processing unit with one or more processors 604, including without limitation one or more general-purpose processors and/or one or more special-purpose processors (such as digital signal processing chips, graphics acceleration processors, and/or the like); one or more input devices 606, which can include without limitation a remote control, a mouse, a keyboard, and/or the like; and one or more output devices 608, which can include without limitation a presentation device (e.g., television), a printer, and/or the like.

The computer system 600 may further include (and/or be in communication with) one or more non-transitory storage devices 610, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 612, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities (e.g., GSM, WCDMA, LTE, etc.), and/or the like. The communications subsystem 612 may permit data to be exchanged with a network (such as the network described below, to name one example), other computer systems, and/or any other devices described herein. In many embodiments, the computer device 600 will further comprise a working memory 614, which can include a RAM or ROM device, as described above.

The computer system 600 also can comprise software elements, shown as being currently located within the working memory 614, including an operating system 616, device drivers, executable libraries, and/or other code, such as one or more application programs 618, which may comprise computer programs provided by various embodiments, and/or may be designed to implement methods, and/or configure systems, provided by other embodiments, as described herein. Merely by way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 610 described above. In some cases, the storage medium might be incorporated within a computer system, such as computer device 600. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer device 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer device 600 in response to processor 604 executing one or more sequences of one or more instructions (which might be incorporated into the operating system 616 and/or other code, such as an application program 618) contained in the working memory 614. Such instructions may be read into the working memory 614 from another computer-readable medium, such as one or more of the storage device(s) 610. Merely by way of example, execution of the sequences of instructions contained in the working memory 635 might cause the processor(s) 604 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 704 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 610. Volatile media include, without limitation, dynamic memory, such as the working memory 614.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 604 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer device 600.

The communications subsystem 612 (and/or components thereof) generally will receive signals, and the bus 602 then might carry the signals (and/or the data, instructions, etc. carried by the signals) to the working memory 614, from which the processor(s) 604 retrieves and executes the instructions. The instructions received by the working memory 614 may optionally be stored on a non-transitory storage device 610 either before or after execution by the processor(s) 604.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for generating domain-compliant image data, comprising:

evaluating, by a computing system, whether particular encoded image data received from one of a live streaming video source and a particular memory location storing recorded video content is restricted from direct export to a particular computing system other than the computing system based on domain-specific usage rights that are associated with the transfer of encoded image data to the particular computing system and that are at least content provider-specific, and wherein the domain-specific usage rights specify maximum allowable spatial frequency content of the particular encoded image data;

generating, by the computing system and based on the evaluating, domain-compliant image data by removing particular disallowable spatial frequency content from the encoded image data without fully decoding the encoded image data prior to transfer to the particular computing system when the particular encoded image data is restricted from direct transfer to the particular computing system; and exporting the particular encoded image data without or with scrambling to the particular computing system when the particular encoded image data is unrestricted from direct transfer to the particular computing system, and the domain-compliant image data to at least a particular memory location of the particular computing system without or with scrambling when the particular encoded image data is restricted from direct transfer to the particular computing system.

2. The method of claim 1, further comprising descrambling the encoded image data prior to removing disallowable spatial frequency content.

3. The method of claim 1, further comprising evaluating domain-specific usage rights according to standard-specific usage rights.

4. The method of claim 1, further comprising quantizing disallowable spatial frequency content of the encoded image data to zero magnitude.

5. The method of claim 4, further comprising generating domain-compliant image data to include allowable spatial frequency content, and disallowable spatial frequency content quantized to zero magnitude.

6. The method of claim 5, further comprising modifying at least a portion of the allowable spatial frequency content to exhibit a finite magnitude less than a corresponding original magnitude within the encoded image data.

7. A computer-implemented method, comprising:
receiving, by a computing system, a data stream of encoded packetized content;
identifying, by the computing system, a particular encoded packet of the data stream as having video content that requires electronic scrambling prior to export from the computing system to a different computing system;
determining, by the computing system, a particular threshold value that defines allowable spatial frequencies of video content within the particular encoded packet, the threshold associated with the export of packetized content from the computing system to the different computing system;
modifying, by the computing system, discrete cosine transform (DCT) coefficients of the particular encoded packet that exhibit a matrix column or row index value greater than the particular threshold value to zero magnitude, without completely decoding the particular encoded packet; and
one of streaming the particular encoded packet to the particular computing system over a network connection and storing the particular encoded packet to a particular memory location of the computing system.

8. The method of claim 7, further comprising preserving DCT coefficients of the particular encoded packet that exhibit a matrix column or row index value less than the particular threshold value without fully decoding the particular encoded packet.

9. The method of claim 7, further comprising modifying DCT coefficients of the particular encoded packet, that exhibit a matrix column or row index value less than the particular threshold value and greater than a second threshold value, to exhibit a finite magnitude less than a corresponding original magnitude.

10. The method of claim 9, further comprising applying one of a power-law transfer function, an exponential transfer function, a linear transfer function; a weighted transfer function, and a raised-cosine transfer function to modify DCT coefficients of the particular encoded packet that exhibit a matrix column or row index value less than the particular threshold value and greater than the second threshold value.

11. The method of claim 7, further comprising: determining that the particular encoded packet is associated with video interlacing; and implementing a DCT filter operation to modify each DCT coefficient, of the DCT coefficients, that are associated with horizontal image resolution.

12. The method of claim 7, further comprising implementing a process preventing appearance of block-like artifacts within an image associated with the DCT coefficients.

13. The method of claim 7, further comprising modifying one or more of the DCT coefficients to exhibit an absolute magnitude different from a corresponding original magnitude to simulate high frequency content.

14. The method of claim 7, further comprising: identifying particular high frequency content; and modifying each of the DCT coefficients to zero magnitude.

15. The method of claim 7, further comprising: identifying particular high frequency content; and removing each of the DCT coefficients.

16. A set-top-box, comprising:
a first module to receive at least one video packet that has a particular pixel count, and extract direct cosine transform (DCT) coefficients within the at least one video packet without fully decoding the at least one video packet;
a second module to modify particular DCT coefficients of the at least one video packet that exhibit a matrix column or row index value greater than a threshold value to zero magnitude, wherein the threshold value defines allowable spatial frequencies of video content within the at least one video packet and is associated with the export of packetized content from the set-top-box to a different computing system;
a third module to generate a particular video packet that has the particular pixel count, the video packet comprising particular DCT coefficients modified by the second module and including DCT coefficients of finite magnitude associated with allowable spatial frequency content, and DCT coefficients of zero magnitude associated with disallowable spatial frequency content; and
at least one communication interface to receive the particular video packet, stream the particular video packet to the different computing system over a network connection, and store the particular video packet to a particular memory location of a particular computing device.

17. The set-top-box of claim 16, wherein the second module further: preserves particular DCT coefficients that exhibit a matrix column or row index value less than the threshold value; and modify particular DCT coefficients, that exhibit a matrix column or row index value less than the threshold value and greater than another threshold value, to exhibit a finite magnitude less than a corresponding original magnitude.

\* \* \* \* \*